United States Patent [19]
Yamaguchi

[11] Patent Number: 5,562,193
[45] Date of Patent: Oct. 8, 1996

[54] METHOD AND APPARATUS FOR INSTALLING AND ADJUSTING A CLUTCH ASSEMBLY

[75] Inventor: Ken H. Yamaguchi, Bellevue, Wash.

[73] Assignee: Paccar Inc, Bellevue, Wash.

[21] Appl. No.: 348,583

[22] Filed: Dec. 2, 1994

[51] Int. Cl.$^6$ ........................................... G01B 3/20
[52] U.S. Cl. ........................................ 192/110 R; 33/606
[58] Field of Search .......................... 192/30 W, 110 R, 192/13 R; 33/613, 626, 655, 606, 811, 701

[56] References Cited

U.S. PATENT DOCUMENTS

| | | | |
|---|---|---|---|
| 1,402,458 | 1/1922 | Strom | 192/110 R |
| 4,474,274 | 10/1984 | Lutz et al. | 192/30 W |
| 4,660,702 | 4/1987 | Flotow | 192/30 W X |
| 5,058,718 | 10/1991 | Tojima et al. | 192/30 W |

FOREIGN PATENT DOCUMENTS

| | | | |
|---|---|---|---|
| 2252131 | 6/1973 | Germany | 192/13 R |
| 902988 | 8/1962 | United Kingdom | 33/606 |

OTHER PUBLICATIONS

Use in Canada of a system having a bracket and a scale that is placed on and taken off of the bracket by a user as shown on the enclosed videotape. (no date).

*Primary Examiner*—Rodney H. Bonck
*Attorney, Agent, or Firm*—Seed & Berry LLP

[57] ABSTRACT

A method and apparatus for installing and adjusting a clutch assembly in a vehicle is shown and described. In a preferred embodiment, a bracket having a plate that simulates a clutch brake and having a measurement device, is mounted on a flywheel housing in which a clutch assembly having a release bearing is mounted. The measurement device is encased by a cover and securely fixed to the bracket, and measures the distance between the plate and the release bearing. In a preferred embodiment, the measurement device has a slidably movable member that may be extended between an outer surface of the plate and an outer surface of the release bearing, thereby measuring the distance between the two surfaces. In order to ensure that an accurate measurement is made, the measurement device is zeroed when an end surface of the slidably movable member is substantially flush with an outer surface of the plate.

18 Claims, 6 Drawing Sheets

METHOD AND APPARATUS FOR INSTALLING AND ADJUSTING A CLUTCH ASSEMBLY

TECHNICAL FIELD

This invention relates to the installation of a clutch assembly in a vehicle, and more particularly, to the measurement and adjustment of the distance that a clutch release bearing travels when disengaging and engaging the clutch.

BACKGROUND OF THE INVENTION

When installing a clutch assembly in a vehicle, for example a truck, it is important to accurately set the distance that the release bearing of the clutch will travel when it engages and disengages the clutch. If this distance is either too great or too small, the clutch will not function properly. For accuracy of installation, it is often preferred to measure and set this distance prior to installing the transmission.

One currently available system for measuring clutch release bearing travel prior to installing the transmission uses a fixture that is mounted to a flywheel housing, the fixture having a rod that is positioned where a clutch brake would be positioned, if a transmission assembly was coupled to tire flywheel housing rather than the fixture. The distance that will exist between the clutch release bearing and the clutch brake is measured by inserting a gauge block between a face of the release bearing and the rod of the fixture. However, the use of a gauge block is a subjective measurement, and depends on tile "touch" of the user. It is therefore difficult to obtain accurate and repeatable results. A need therefore exists for an improved method and apparatus for measuring and adjusting tile gap between tire release bearing and clutch brake.

SUMMARY OF THE INVENTION

It is therefore an object of this invention to provide an improved method and apparatus for installing a clutch assembly in a vehicle.

It is another object of this invention to provide an improved method and apparatus for measuring and adjusting the distance between a release bearing and a clutch brake.

It is another object of this invention to provide a method and apparatus for measuring and adjusting the distance between a release bearing and clutch brake that is simple to use, and that will provide accurate, repeatable results.

These and other objects of the invention, as will be apparent herein, are accomplished by use of an improved clutch adjustment device. In a preferred embodiment, the clutch adjustment device includes a bracket that is adapted to be detachably attached to a flywheel housing, in which a clutch assembly having a release bearing is installed. The bracket has a plate having an outer surface that simulates an outer surface of a clutch brake when the bracket is coupled to the flywheel housing.

In order to measure the distance or gap that will exist between the release bearing and a clutch brake when a transmission assembly is coupled to the flywheel housing, a measurement device is coupled to the bracket. In a preferred embodiment, the measurement device has a member that is slidably movable between an outer surface of the plate and an outer surface of the release bearing, and provides a digital readout of the distance between the two surfaces. In an alternative embodiment, an optical sensor is used to measure the distance between the plate and the release bearing.

To ensure accurate and repeatable results, the measurement device is securely mounted to bracket, and encased within a protective cover, to isolate the device. In this manner, operator-induced errors are substantially eliminated, because the measuring device is secured in a precise location and the opportunity for introducing error by moving or dropping the device is minimized.

To further ensure that an accurate measurement is taken, the measurement device is calibrated prior to taking a measurement. Although this may be accomplished in a variety of ways, in a preferred embodiment, a calibration tool having a flat surface, for example a metal stop, is placed against the outer surface of the plate by an operator. The slidable member is extended until it is substantially flush with the metal stop, and the measurement device is zeroed. The measurement device is thus zeroed when an end surface of the slidable member is substantially flush with the outer surface of the plate. An accurate measurement of the distance between the plate and the release bearings can then be made by sliding the member towards the release bearing until the end surface of the member is substantially flush with an outer surface of the release bearing, and noting the distance indicated by the measurement device.

The bracket is further provided with a rod or shaft that is adapted to engage and move the release bearing, thereby ensuring that the clutch is properly aligned prior to measuring the distance between the plate and the release bearing. In this manner, the rod simulates a release bearing fork that will be present when a transmission assembly is coupled to the flywheel housing.

DETAILED DESCRIPTION OF THE INVENTION

Figure 1:
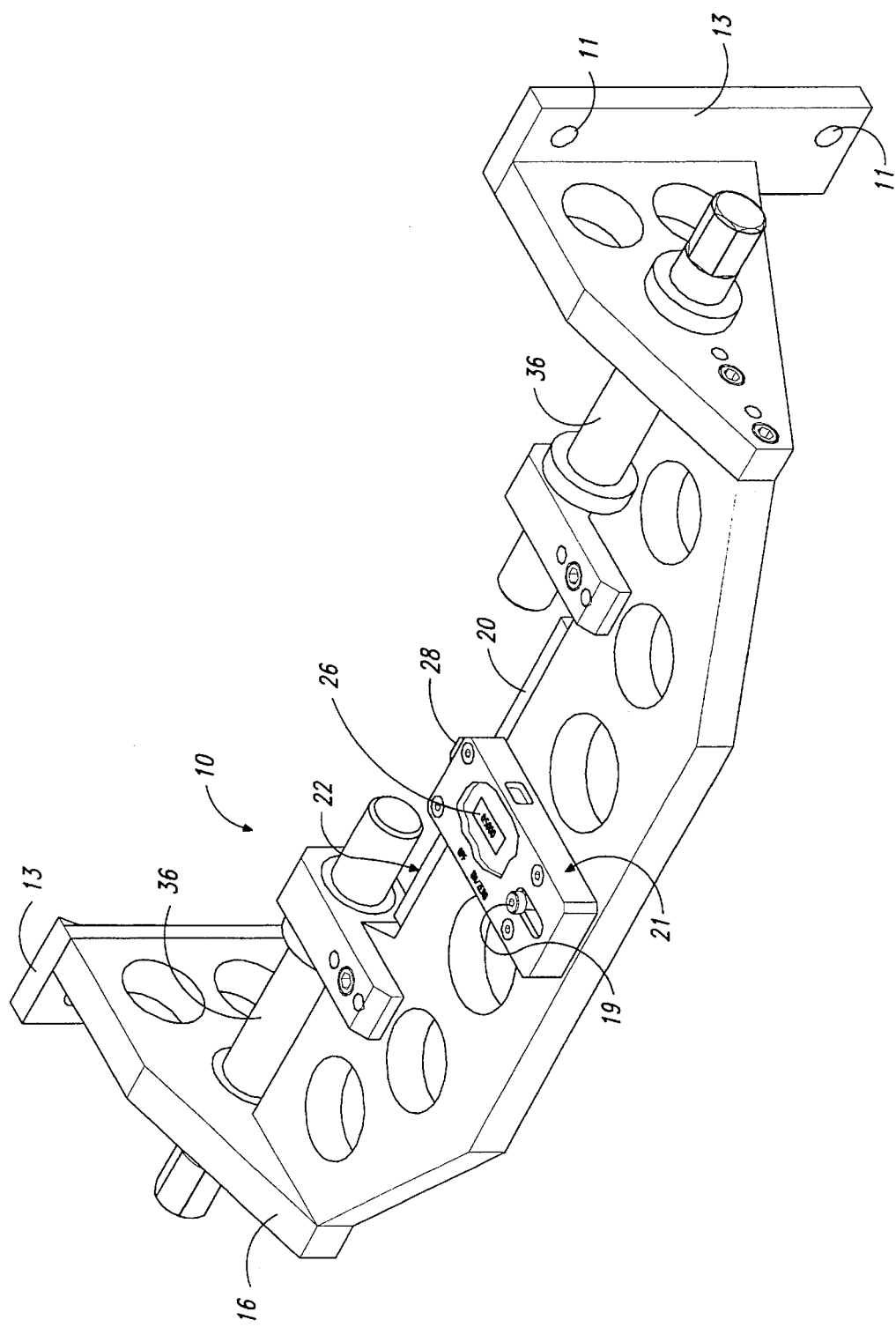
FIG. 1 is a front isometric view of a preferred embodiment of the present invention.
Figure 2:
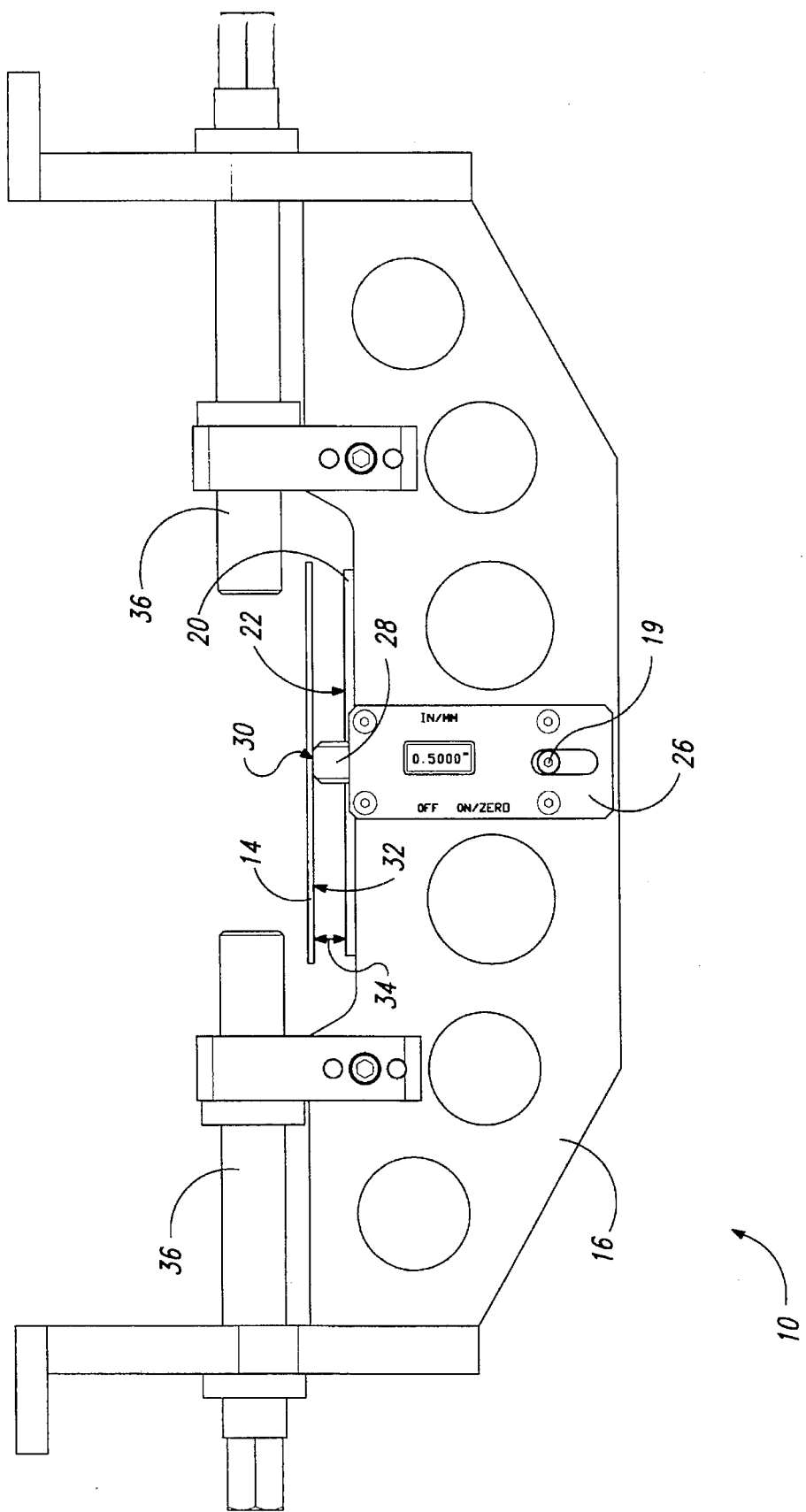
FIG. 2 is a top plan view of the apparatus of FIG. 1.
Figure 3:
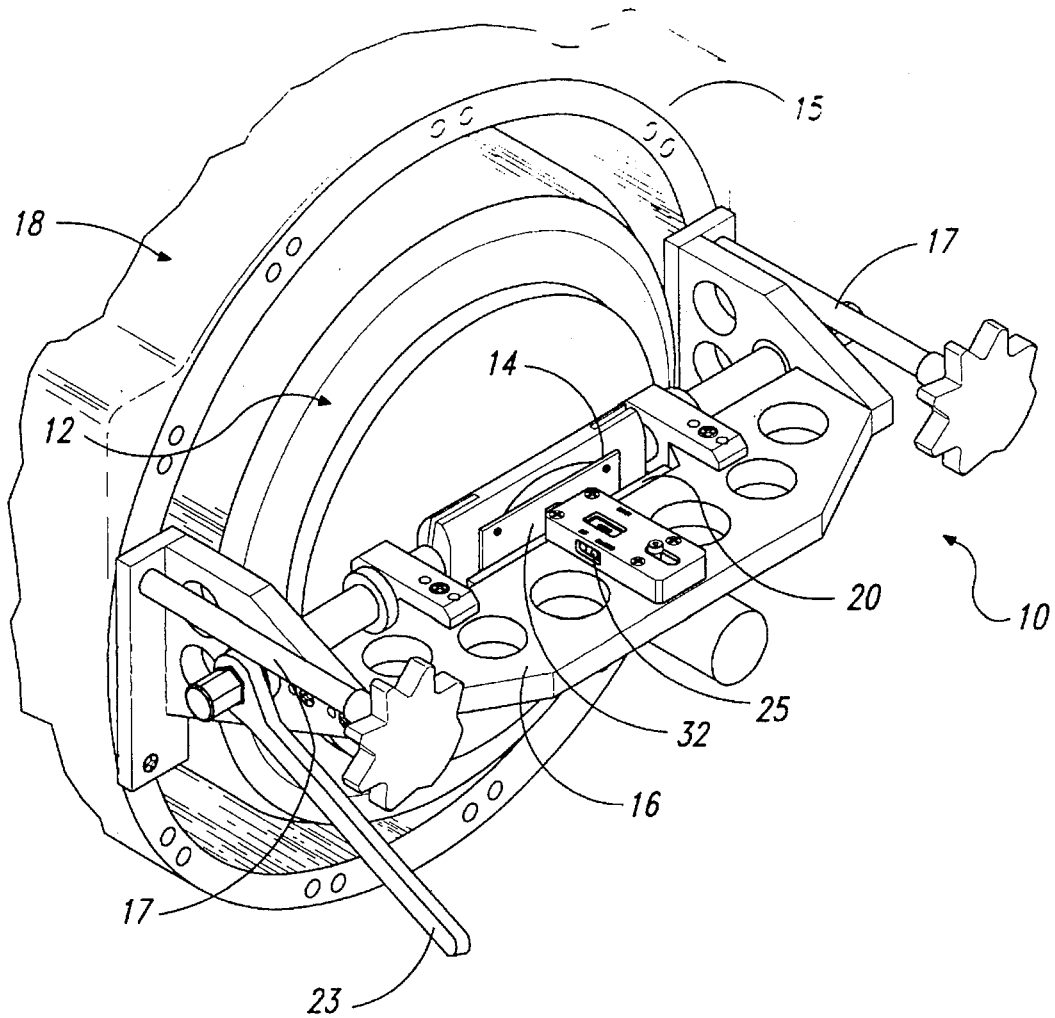
FIG. 3 is a front isometric view of the apparatus of FIG. 1 as used in a flywheel housing having a clutch assembly therein.

In a preferred embodiment, as illustrated in FIGS. 1–3, clutch adjustment device 10 is comprised of a bracket 16 that may be coupled to a flywheel housing 18. Although this may be accomplished in a variety of ways, in a preferred embodiment, bolt holes 11 are provided in flanges 13 of bracket 16, bolt holes 11 being aligned with bolt holes 15 on flywheel housing 18, such that the bracket 16 may be detachably attached to the flywheel housing 18 via bolts 17.

Figure 4:
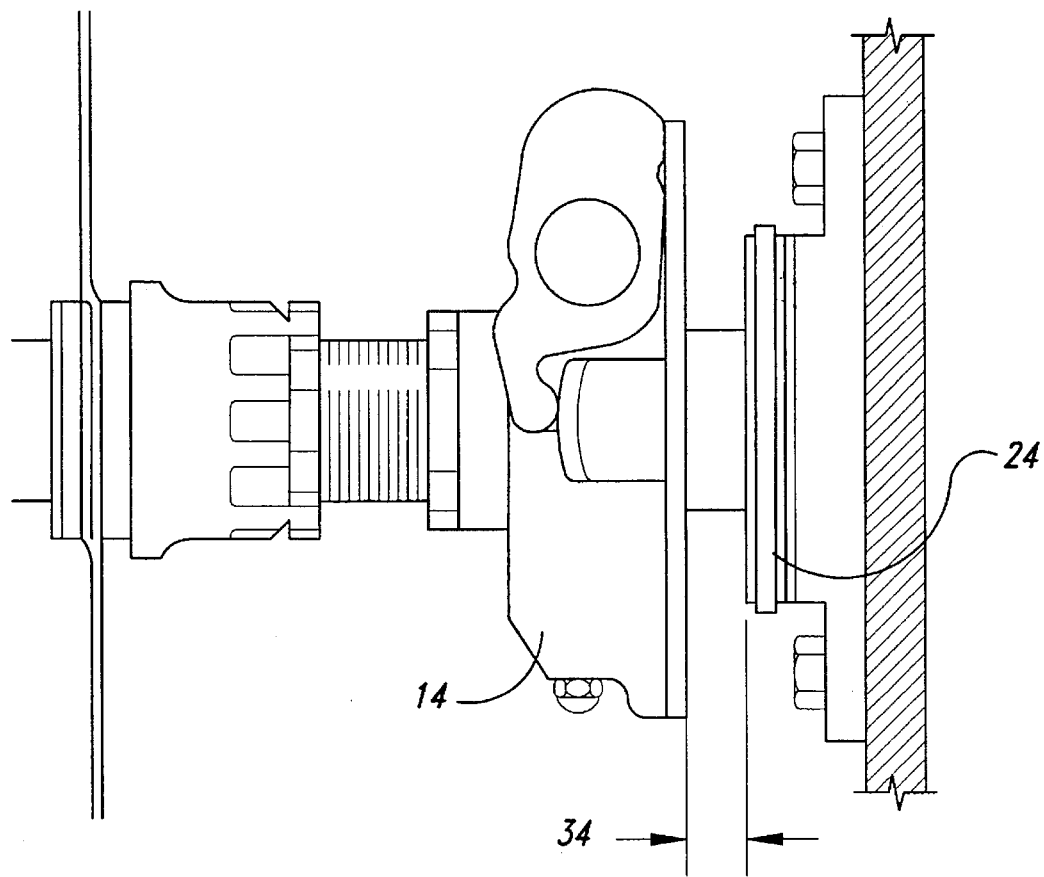
FIG. 4 is a side elevational schematic view of an interface between a clutch assembly and a clutch brake.

Installed within flywheel housing 18 is clutch assembly 12, the clutch assembly 12 having a release bearing 14 that has an outer surface 32. In order to measure the distance 34 that will exist between outer surface 32 of release bearing 14 and a clutch brake 24 when a transmission assembly is installed, as illustrated by reference arrow 34 in FIG. 4, a plate 20 is provided on bracket 16. Plate 20 may be integral to the bracket, or may be a separate member that is coupled to the bracket 16, for example via bolts (not shown). An outer surface 22 of plate 20 simulates the position of an outer surface of the clutch brake 24 when the bracket 16 is coupled to flywheel housing 18.

Figure 5:
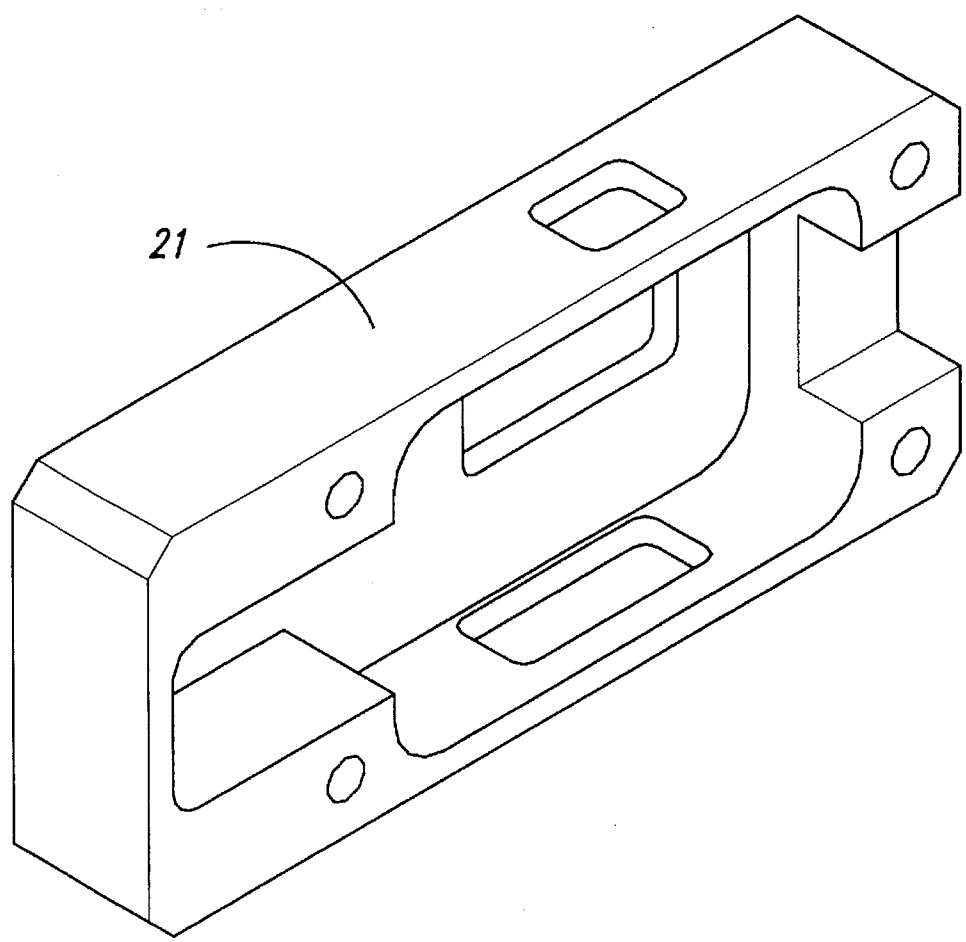
FIG. 5 is a bottom isometric view of a cover as used with the apparatus of FIG. 1.

A measurement device 26 is mounted on bracket 16 substantially perpendicular to plate 20 and release bearing 14. To ensure that accurate and repeatable results are obtained, the measurement device 26 is securely fixed to bracket 16, and is encased by cover 21, as illustrated in FIG. 5, thereby isolating the measurement device. By securing and isolating the measurement device in this manner, operator-induced error, for example from moving or dropping the measurement device, is substantially eliminated. Once the device is calibrated, it will stay in the proper position for many uses because it is securely fixed to the bracket and is isolated from operator movement of the measuring device itself.

In a preferred embodiment, the measurement device 26 is provided with a slidably movable member 28, as best seen in FIG. 2, which may extend between outer surface 22 of plate 20 and outer surface 32 of release bearing 14. Although a variety of measurement devices may be used, in a preferred embodiment, a Digimatic Scale Unit manufactured by Mitutoyo, Part No. 572-210-50, is used. The measurement device 26 has a lever 19 that moves the slidably movable member 28, and has a button 25 that, when depressed, zeroes the scale. The scale may therefore be zeroed at any desired location. In an alternative embodiment, an optical sensor is used to measure the distance between the release bearing 14 and the location of where clutch break 24 will be when the clutch brake is installed.

In a preferred embodiment, the scale is zeroed when an end surface 30 of member 28 is substantially flush with outer surface 22 of plate 20. This may be accomplished by placing a calibration tool having a flat surface, for example a metal calibration stop, against outer surface 22 of plate 20, and extending member 28 until end surface 30 is substantially flush with the metal stop. Be zeroing the scale while the end surface 30 of member 28 and the outer surface 22 of plate 20 are substantially flush with a common, perpendicular member, the measurement device will be calibrated to be zeroed when end surface 30 of member 28 is substantially flush with outer surface 22 of plate 20. It will be understood that the gap between the clutch break and the release bearing may also be determined by measuring the distance between any selected reference point on the bracket 16 and the outer surface 32 of release bearing 14, assuming that the distance between the reference point and the location of a clutch break when it is installed is known. However, although other reference points can be used, the front surface of a plate 20 is selected for convenience in calibration and measuring.

An accurate measurement of distance 34 may therefore be taken by sliding member 28 towards the release bearing 14 until end surface 30 of member 28 is substantially flush with outer surface 32 of release bearing 14. In a preferred embodiment, the measurement device provides a digital readout of distance 34, which measurement may be recorded and used to adjust the positioning of the clutch assembly 12.

Bracket 16 also has a shaft 36 that is adapted to simulate the action of a release bearing fork that will be coupled to the flywheel housing 18 as part of a transmission assembly. More specifically, shaft 36 is adapted to engage and move the release bearing 14 when lever 23 is placed on an end of shaft 36 and pumped up and down, thereby seating the clutch springs. By releasing the clutch in this manner, the clutch may therefore be properly aligned prior to measuring distance 34 between plate 20 and release bearing 14. After proper alignment of the clutch plate by operating it in the manner it will be operated in during its use in the vehicle, the distance 34 is measured. If the distance 34 is not correct, the entire clutch assembly 12 is readjusted and secured within the flywheel housing to place it at the proper position before final assembly in the truck.

Figure 6:
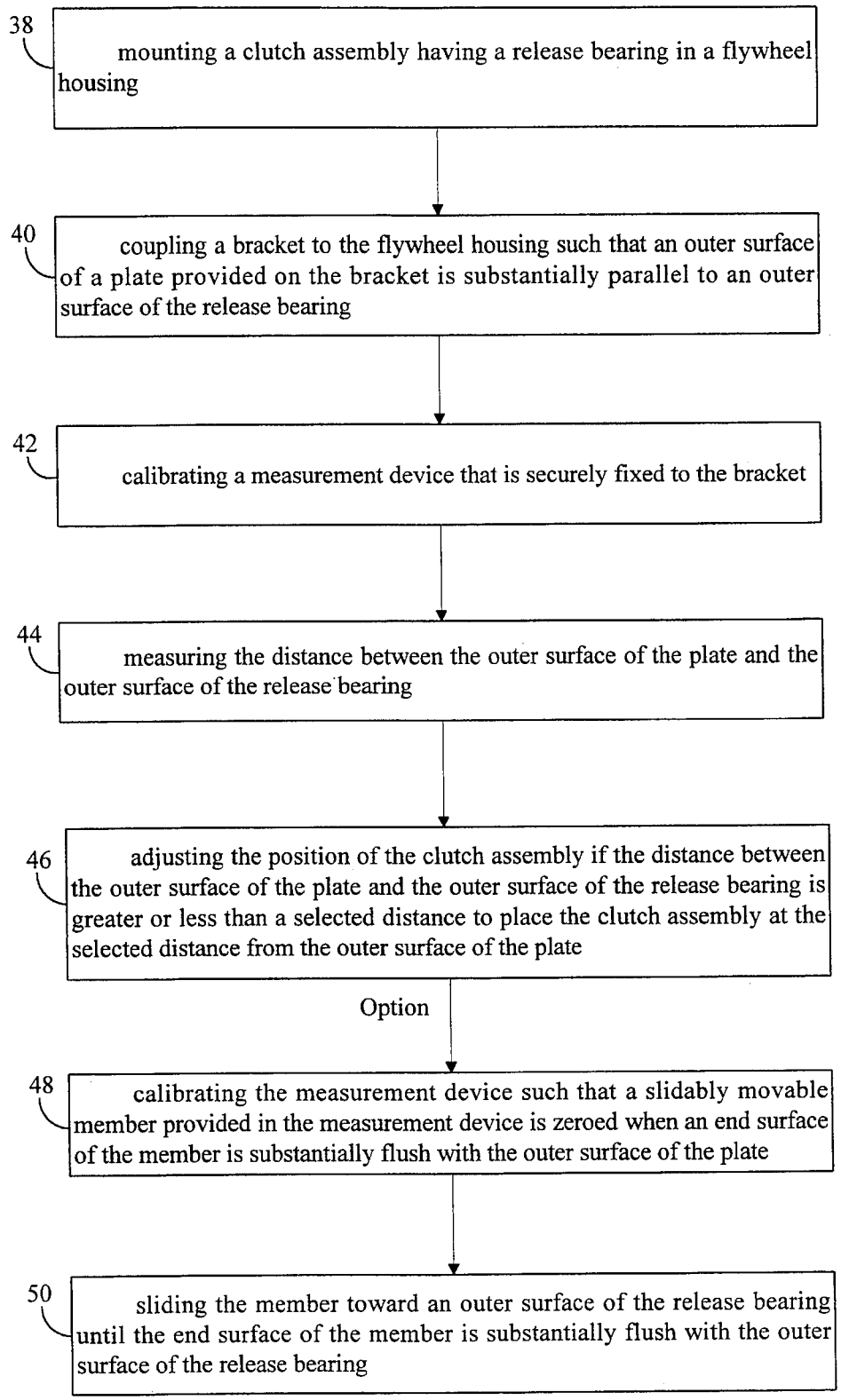
FIG. 6 is a diagram illustrating the steps of a preferred embodiment of the present invention.

Therefore, as illustrated in FIG. 6, a clutch assembly is installed in a vehicle and adjusted by mounting a clutch assembly 12 having a release bearing 14 in a flywheel housing 18, step 38. A bracket 16 is coupled to the flywheel housing 18 such that an outer surface 22 of plate 20 provided on bracket 16 is substantially parallel to an outer surface 32 of the release bearing 14, step 40. A measurement device that is securely fixed to the bracket is calibrated, step 42, and then used to measure the distance between the outer surface 22 of the plate 20 and outer surface 32 of release bearing 14, step 44. The position of the clutch assembly 12 may therefore be adjusted if the distance between the outer surface of the plate and the outer surface of the release bearing is greater than or less than a selected distance, step 46, after which the distance may be remeasured to ensure that it is a desired value. By measuring clutch release bearing travel in accordance with a preferred embodiment of the present invention, therefore, accurate and repeatable results are obtained in a simple and efficient manner, and a clutch assembly is located in a desired position.

In a preferred embodiment, the measurement device is zeroed when the end surface 30 of the slidably moveable member 28 provided in the measurement assembly, is substantially flush with the outer surface 22 of plate 20, step 48. A measurement of the gap between the release bearing and clutch break is made by sliding the moveable member outward until the end surface 30 is substantially flush with an outer surface 32 of release bearing 14, step 50.

A method and apparatus for installing a clutch assembly in a vehicle has been shown and described. From the foregoing, it will be appreciated that, although embodiments of the invention have been described herein for purpose of illustration, various modifications may be made without deviating from the spirit and scope of the invention. Thus, the present invention is not limited to the embodiments described herein, but rather is defined by the claims which follow.

I claim:

1. An apparatus for measuring clutch release bearing travel while installing a clutch assembly in a vehicle comprising:

a bracket adapted to be detachably attached to a flywheel housing in which a clutch assembly having a release bearing is installed, the bracket having a plate that has an outer surface that simulates an outer surface of a clutch brake when the bracket is coupled to the flywheel housing; and a measurement device securely fixed to the bracket, the measurement device being adapted to measure the distance between the outer surface of the plate and an outer surface of the release bearing.

2. The apparatus according to claim 1, wherein the plate is an integral member of the bracket.

3. The apparatus according to claim 1, wherein the plate is a separate member that is coupled to the bracket.

4. The apparatus according to claim 1, further comprising:

a cover that encloses the measurement device and that is securely fixed to the bracket, thereby isolating the measurement device and ensuring that accurate and repeatable results are obtained.

5. The apparatus according to claim 1 wherein the measurement device provides a numerical readout.

6. The apparatus according to claim 1 wherein the bracket is further provided with a rod that is positioned such that when the bracket is attached to the flywheel housing, the rod simulates a release fork that may be used to engage and move the release bearing to ensure that the clutch is properly aligned prior to measuring the distance between the outer surface of the plate and the outer surface of the release bearing.

7. The apparatus according to claim 1 wherein the measurement device is provided with a member that is slidably moveable between the outer surface of the plate and the outer surface of the release bearing.

8. A clutch adjustment assembly comprising:
    a flywheel housing;
    a clutch assembly having a release bearing, the clutch assembly being installed within the flywheel housing;
    a bracket adapted to be detachably attached to the flywheel housing;
    a plate coupled to the bracket and having an outer surface adapted to simulate an outer surface of a clutch brake; and
    a measurement device securely fixed to the bracket, the measurement device being adapted to measure the distance between the outer surface of the plate and an outer surface of the release bearing.

9. The apparatus according to claim 8, wherein the plate is an integral member of the bracket.

10. The apparatus according to claim 8, wherein the plate is a separate member that is coupled to the bracket.

11. The apparatus according to claim 8, further comprising:
    a cover that encloses the measurement device and that is securely fixed to the bracket, thereby isolating the measurement device and ensuring that accurate and repeatable results are obtained.

12. The apparatus according to claim 8 wherein the measurement device provides a numerical readout.

13. The apparatus according to claim 8 wherein the bracket is further provided with a rod that is positioned such that when the bracket is attached to the flywheel housing, the rod simulates a release fork that may be used to engage and move the release bearing to ensure that the clutch is properly aligned prior to measuring the distance between the outer surface of the plate and the outer surface of the release bearing.

14. The apparatus according to claim 8 wherein the measurement device is provided with a member that is slidably moveable between the outer surface of the plate and the outer surface of the release bearing.

15. An apparatus for measuring clutch release bearing travel while installing a clutch assembly in a vehicle comprising:
    a bracket adapted to be detachably attached to a flywheel housing in which a clutch assembly having a release bearing is installed; and
    a measurement device securely fixed to the bracket, the measurement device being adapted to measure the distance between a given point on the bracket and an outer surface of the release bearing and provide a numerical readout of the distance.

16. The apparatus according to claim 15, further comprising:
    a cover that encloses the measurement device and that is securely fixed to the bracket, thereby isolating the measurement device and ensuring that accurate and repeatable results are obtained.

17. A method for adjusting a clutch assembly in a vehicle comprising:
    mounting a clutch assembly having a release bearing in a flywheel housing;
    coupling a bracket to the flywheel housing such that an outer surface of a plate provided on the bracket is substantially parallel to an outer surface of the release bearing;
    calibrating a measurement device that is securely fixed to the bracket;
    measuring the distance between the outer surface of the plate and the outer surface of the release bearing; and
    adjusting the position of the clutch assembly if the distance between the outer surface of the plate and the outer surface of the release bearing is greater or less than a selected distance to place the clutch assembly at the selected distance from the outer surface of the plate.

18. The method according to claim 17, further comprising:
    calibrating the measurement device such that a slidably movable member provided in the measurement device is zeroed when an end surface of the member is substantially flush with the outer surface of the plate; and
    sliding the member toward an outer surface of the release bearing until the end surface of the member is substantially flush with the outer surface of the release bearing.

* * * * *